United States Patent [19]

Smith

[11] Patent Number: 5,066,174

[45] Date of Patent: Nov. 19, 1991

[54] CARTRIDGE CASE FLASH HOLE FINISHING TOOL

[75] Inventor: Randy L. Smith, Centre Hall, Pa.

[73] Assignee: Blount, Inc., Portland, Oreg.

[21] Appl. No.: 518,755

[22] Filed: May 3, 1990

[51] Int. Cl.⁵ .............................................. B23B 41/00
[52] U.S. Cl. ........................................ 408/79; 86/37;
408/202
[58] Field of Search .................. 408/79, 80, 83.5, 113,
408/114, 202, 200, 203, 14, 241 S; 86/36, 37, 24

[56] References Cited

U.S. PATENT DOCUMENTS

| | | | |
|---|---|---|---|
| 1,386,888 | 8/1921 | Masters | 408/202 |
| 2,601,809 | 7/1952 | DiNardo | 408/83.5 |
| 2,677,309 | 5/1954 | Koons | 408/83.5 |
| 2,787,196 | 4/1957 | Stadler | 408/83.5 |
| 4,807,511 | 2/1989 | Markle | 86/24 |

FOREIGN PATENT DOCUMENTS

| | | | |
|---|---|---|---|
| 554739 | 6/1923 | France | 86/37 |
| 1012256 | 7/1952 | France | 86/36 |
| 33555 | 12/1910 | Sweden | 408/83.5 |

Primary Examiner—Daniel W. Howell
Attorney, Agent, or Firm—Robert L. Harrington

[57] ABSTRACT

A tool for finishing the aperture in the base of a cartridge case. The typical cartridge case has a cylindrical neck and the aperture is located on the axis that extends from the cylindrical neck. A pilot is provided on the shank of an aperture cutting tool coaxial with a cutter on the tool. A limit stop is provided above the pilot and the combination is adjustable and lockable at a desired position on the shank. The combination pilot and limit stop is positioned relative to the cutter so that as the pilot enters the neck, the cutter is guided into the aperture. The stop limit provides the exact amount of cutter entry for removing burrs but without enlarging the aperture.

8 Claims, 2 Drawing Sheets

CARTRIDGE CASE FLASH HOLE FINISHING TOOL

BACKGROUND INFORMATION

1. Field of the Invention

The invention relates to a tool utilized in reloading spent cartridge cases and in particular it relates to a piloted finishing tool for deburring and chamfering an edge of the primer receiving aperture in a cartridge case, known as the flash hole.

2. Background of the Invention

The reloading of spent cartridge cases is a finely developed art. The reloading operation is typically accomplished with a reloading press and related tooling to perform the many operations required. Basic operations necessary to accomplish the reloading of spent cartridge cases include; removal of the spent primer, inserting and seating a new primer, resizing the cartridge case, charging the case with powder, and seating a bullet in the case.

As stated, the above is but basic to a reloading operation. Many individuals who reload their own ammunition, especially those involved in competitive shooting meets, go beyond the basics to obtain the utmost in consistency from shell to shell in the reloaded ammunition. The uniform ignition of the powder charge is one area that is of concern.

During the original manufacture of the cartridge case, the flash hole in the base of the cartridge often is produced by a punching operation. The punch tends to leave a burr of upstanding material at the periphery of the flash hole within the cartridge. This burr tends to shield the powder surrounding the flash hole and thus will affect the ignition of the powder by the primer when a weapon is fired.

To insure uniformity and consistency in the ignition of the powder, the serious reloader removes the burr. Additionally, the edge of the flash hole is slightly chamfered, which provides a "funnel" (i.e., a frusto-conical section) that aids in the even ignition of the powder by the primer.

The burr removal and chamfering operation was accomplished by using a tool that was insertable into the cavity of the cartridge case. The tool had a cutter section mounted on its end and generally had an end guide that was inserted into the flash hole to steady the tool during the cut. This tool lacked in features that would provide the desired end results for the user. The tool did not have a suitable centering guide. It was very difficult to obtain a chamfer that was axially aligned with the flash hole and it did not have a positive stop to limit the depth of cut of the cutter. An additional frustration was that a user had to "hunt and peck" with the end of the tool to position the end guide in the flash hole.

U.S. Pat. No. 4,807,511 issued to Markle discloses a hand held tool for deburring and chamfering the flash hole that has a depth stop and a conical guide. The depth stop of the tool however, is placed adjacent the cutter, and the burrs removed from the flash hole may stay between the stop and the bottom of the cartridge resulting in an inaccurate depth control. Also, the conical centering device centers the center piece of the tool relative to the neck of the cartridge, but it does not positively guide the cutting portion of the tool into the flash hole.

SUMMARY OF THE INVENTION

The preferred finishing tool of the present invention has a configured cutter installed on one end of an elongate shaft. The end of the shaft is insertable into the cavity of the cartridge with the cutter end engaging the flash hole of the cartridge. The tool is guided and aligned relative to the flash hole by a pilot that is adjustably mounted on the shaft. The pilot is cylindrical in shape and is dimensionally mated to the interior diameter of the neck of the cartridge so that the pilot will just slide into the neck of the cartridge and thereby keep the cylinder axis centered in the cartridge. The pilot cylinder and the cylindrical shaft are coaxial, and the pilot fitting within the neck of the cartridge aligns and guides the cutter end of the tool into the flash hole. The tool is rotated to provide the cutting action by the cutter to remove burrs and/or chamfer the flash hole. A stop adjacent to the pilot has a diameter larger than the neck diameter of the cartridge and will abut a rim on the neck to limit the depth of cut by the cutter. A removable handle is provided on the end of the shaft opposite the cutter end for manual manipulation. The handle may be removed and the tool chucked in a drill chuck or similar holding device.

DESCRIPTION OF THE PREFERRED EMBODIMENT

Figure 1:
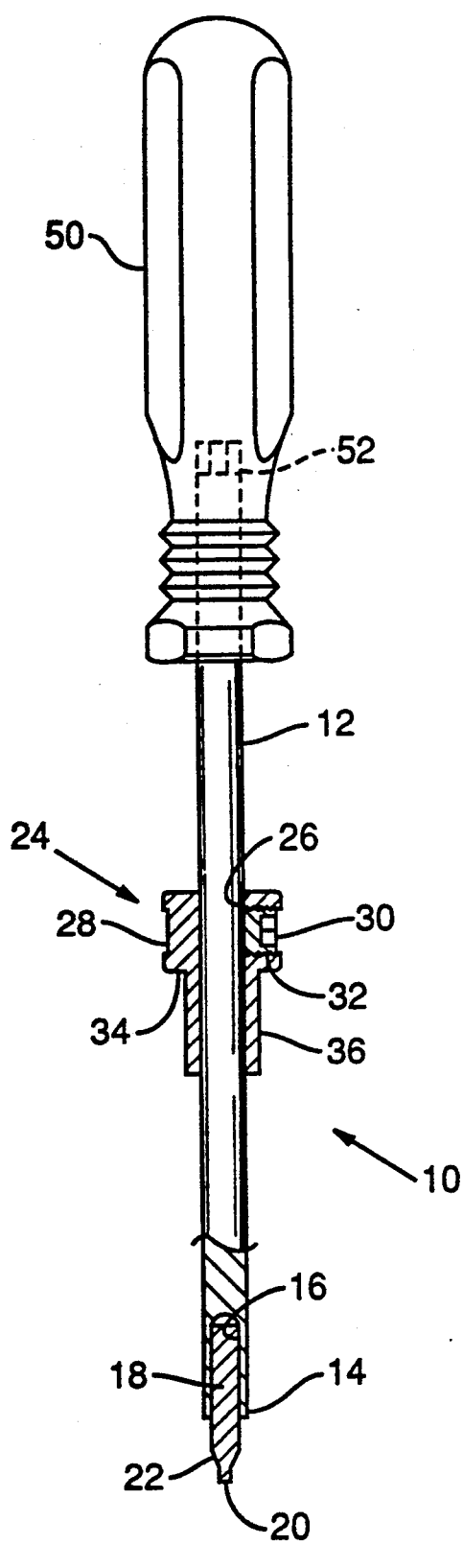
FIG. 1 is a side view partially in section of a finishing tool in accordance with the present invention.

With reference to the drawings, the tool 10 has an elongate shank 12 preferably cylindrical in shape. The shank has at an end 14 a central blind bore 16. Removably installed in the bore 16 and extending beyond end 14, is a configured appliance 18. As shown in the figure, an end guide 20 is provided on the appliance 18 with a cutter portion 22 adjacent the end guide 20. The cutter portion 22 is conical in shape and is typical of cutters utilized to produce a bevel or chamfer on an edge.

A shaped cylindrical member 24 having two cylindrical sections, is adjustably mounted on the shank 12 of the tool 10. The shank 12 of the tool 10 fits slidably within a central through-bore 26 formed in the member 24.

The cylindrical section having the larger diameter is a limit stop 28. A lock screw 30 is threadably installed in a threaded bore 32 in the side wall of the stop 28. The threaded bore 32 is normal to and intersects the bore 26 in the member 24. An end of the lock screw 30 is engagable, in a conventional manner, with the shank 12 of the tool 10 and thus will frictionally secure the member 24 in a position on the shank 12. An end face 34 on the limit stop 28 will abut a rim 41 of the neck end of a cartridge case, as will be explained later, to limit the travel of the tool 10 within the cartridge case.

Figure 2:
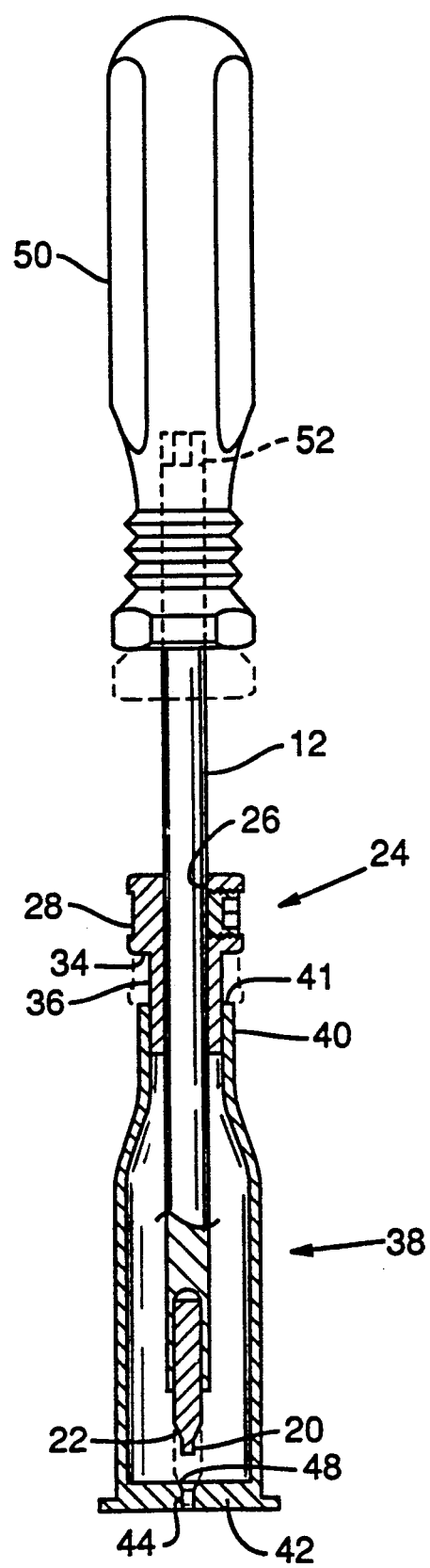
FIG. 2 is a view of the finishing tool of FIG. 1 inserted into a cartridge case.

The cylindrical section of the member 24 having the smaller diameter is a pilot 36. As shown in FIG. 2, the pilot 36 is slidably insertable into the neck 40 of a cartridge case 38, with the external arcuate surface of the pilot 36 being in sliding engagement with the internal arcuate surface of the cylindrical neck 40 of the case 38. The pilot 36 engaging the neck 40 of the cartridge case aligns the shank 12 of the tool 10 coaxially with the cartridge case 38.

The cartridge case 38 shown in FIG. 2 is typical of a configured cylindrical bottleneck cartridge case of the industry and has a circular base 42. A circular aperture 44, commonly referred to as a flash hole, is provided in the center of the base 42. The aperture 44 is coaxial with cylindrical neck 40 provided at the opposite end of the configured cylinder. The top edge of the neck 40 (as viewed in the figures) is the rim 41. The aperture 44 and the neck 40 are coaxial with the longitudinal axis of the cartridge 38.

FIG. 1 shows a removable handle 50 attached to the end 52 of the shank 12 of the tool 10. The handle is provided for the manual manipulation of the tool 10. The handle 50 is removable so that the shank 12 of the tool 10 may be secured in other known fixtures such as a drill chuck.

The member 24 is positioned and secured to the shank 12 preparatory to the finishing operation. The position of the member 24 on shank 12 is determined by the required distance between the face 34 of the limit stop 28 and the cutter 22 on the appliance 18. This distance is determined by the distance between the rim 41 and the aperture 44 of the cartridge 38.

Figure 3:
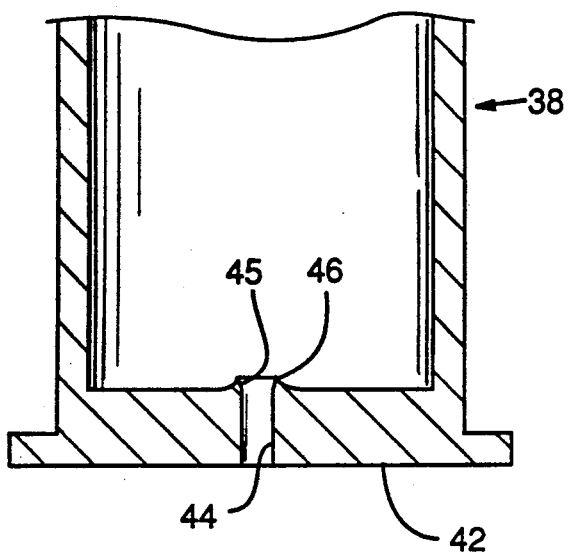
FIG. 3 is an enlarged partial sectional view illustrating the flash hole of the cartridge case prior to finishing.

To perform the finishing operation, i.e., the deburring and chamfering of the aperture 44 in the case 38, the end 14 of the shank 12 is inserted into the cartridge 38 through the neck 40. Refer to FIG. 2 which shows the tool 10 partially inserted into the cartridge case 38 in solid lines. As the tool 10 is introduced into the cartridge case 38, the pilot 36 enters the neck 40 and is maintained in axial alignment by the substantial length of the outer cylindrical surface mated to a corresponding length of the neck interior. The tool 10 thus aligned, is advanced into the case 38 toward the aperture 44 (centered on the axis of neck 40). The end guide 20 is slightly smaller dimensionally than that of the aperture 44, extends into the flash hole and provides centering for the cutter 22. Rotation of the tool 10 produces the cutting action of the cutter 22 to remove any upstanding burrs 46 from the edge 45 (FIG. 3). Continued rotation of the tool 10 chamfers the edge 45 of the aperture 44. The face 34 on the limit stop 28 contacting the rim 41 of the neck 40 limits the advancement of the tool 10 thereby limiting the depth of cut of the cutter 22.

The dashed lines of FIG. 2 show the position of the tool 10 at the completion of the finishing operation (deburring and chamfering) with the face 34 of the limit stop 28 in contact with the rim 41 of the neck 40 of the case 38.

Figure 4:
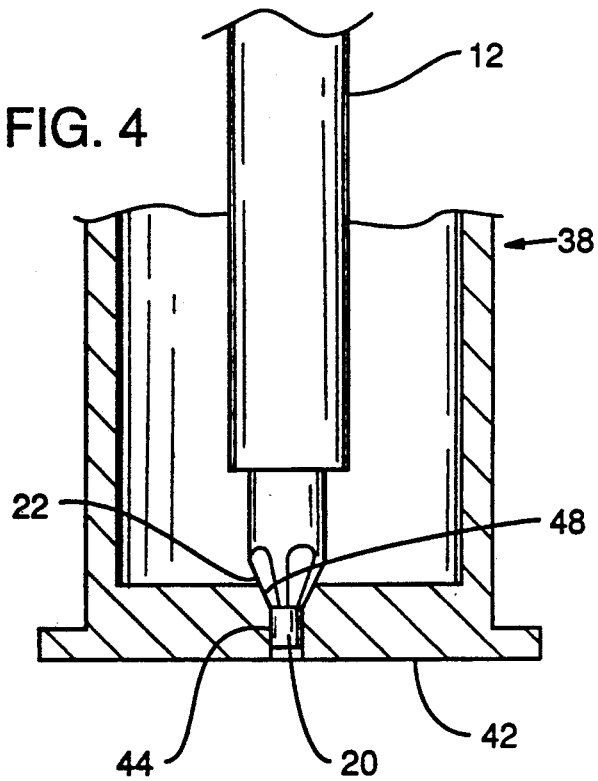
FIG. 4 is a view similar to FIG. 3 with the cutter portion of the tool inserted in the flash hole.

FIGS. 3 and 4 illustrate the aperture 44 in the base 42 of the cartridge 38. FIG. 3 shows the burrs 46 around the upper edge 45 of the aperture 44. FIG. 4 shows the cutter portion 22 in the flash hole 44 at the completion of the finishing operation. Note that the burrs 46 have been removed and a chamfer 48 is formed on the upper edge 45. The angle of the chamfer 48 is determined by the angle of the conical cutter portion 22. As previously stated, the limit stop 28 abutting against the rim 41 limits the depth of cut by the cutter portion 22.

Figure 5:
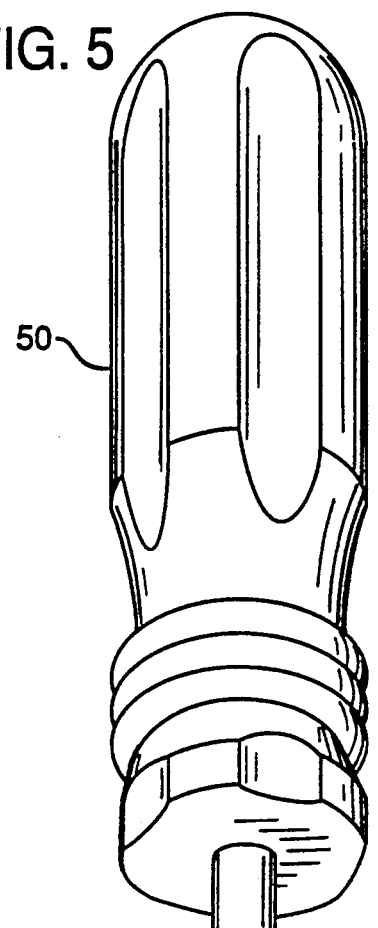
FIG. 5 is an alternate embodiment of the combination pilot and stop member.

FIG. 5 is an alternate embodiment of the combination pilot and stop member 24. As shown, the pilot 36' has three equally spaced arcuate sections having a common center and equal radii. When the combination pilot and stop member is installed on the tool 10, the center of the three arcuate sections will be coincident with the longitudinal axis of the shank 12. The configuration reduces the contact area between the neck of the cartridge and the pilot, yet it affords the same guide and limit stop capability. This is just one of many configurations that the combination pilot and stop member may have.

The positive axial alignment of the tool 10 with the aperture 4 combined with the positive stop arrangement, ensures equality between the finished apertures 44 from cartridge case to cartridge case.

The user has the option of having a tool 10 for each caliber cartridge case or having a single tool with interchangeable members 24, the members 24 corresponding to the different size requirements between calibers. Accordingly, an appliance 8 is provided based on the requirements of the caliber of the cartridge case.

It will be apparent to those skilled in the art that modifications and variations may be made without departing from the scope of the invention. The invention is therefore not to be limited to the disclosure as detailed in the drawings and the description but is to be determined from the appended claims.

What is claimed is:

1. A tool for finishing a pre-bored flash hole aperture in a base at one end of a cartridge case, the case having an opening at its opposite end defining the entry into a cylindrical neck portion, said opening spaced from said flash hole aperture, said cylindrical neck and aperture coaxial with the longitudinal axis of the case, said tool comprising:

an elongate shank having a longitudinal axis, a pilot fixedly positioned on the shank, an outer surface of the pilot having a top and bottom and configured to fit in sliding engagement with the interior of the neck, a burr-removing, hole-finishing cutter on an end of the shank spaced from said pilot bottom a distance less than the spacing between the entry and flash hole aperture of the cartridge case, said cutter and pilot outer surface coaxial with the axis of the shank;

said outer surface of the pilot mated to the interior of the cartridge case neck whereby extension of the pilot into the cartridge case neck maintains a coaxial relationship of one to the other and thereby guides the cutter from a position short of the aperture to a position within the pre-bored aperture to be worked therein for removing burrs from the aperture periphery.

2. A tool for finishing a flash hole aperture in a base at one end of a cartridge case, the case having an opening at its opposite end and a rim defining the entry into a cylindrical neck portion, said cylindrical neck and aperture coaxial with the longitudinal axis of the case, said tool comprising:

an elongate shank having a longitudinal axis, a pilot on the shank, an outer surface of the pilot configured to fit in sliding engagement with the interior of the neck, a finishing cutter on an end of the shank, said cutter and pilot outer surface coaxial with the axis of the shank;

said outer surface of the pilot mated to the interior of the cartridge case neck, a limit stop on the shank on the side of the pilot opposite said cutter, said limit stop adapted to engage the rim of the cartridge following entry of the pilot into the cartridge case neck, said rim being spaced from the cutter an exact distance to permit entry of the cutter into the aperture for removing burrs while preventing over extension thereof.

3. A tool as defined in claim 2 wherein the limit stop is adjustable on the shank and including locking means for selectively locking said limit stop to the shank at the determined distance from the cutter.

4. A tool as defined in claim 3 wherein the cutter, pilot and limit stop are removable and replaceable on the shank to adapt the tool to different cartridge case sizes.

5. A tool as defined in claim 4 wherein the limit stop and pilot are integral for removal, replacement and locking of the pilot and limit stop as a common unit.

6. A tool as defined in claim 5 including a handle on a shank end opposite the cutter for manual manipulation of the tool relative to the cartridge case.

7. A tool as defined in claim 6 wherein the handle is removable from the shank end, said shank end configured for mounting in a fixture.

8. A tool as defined in claim 1, wherein the outer surface of the pilot is cylindrical.

* * * * *